July 9, 1968  C. R. LANDERS  3,391,472

APPARATUS FOR CONVEYING AND DRYING PELLETS

Filed Oct. 1, 1965

INVENTOR
Charles R. Landers
BY
Robert A. Freeman
ATTORNEY

United States Patent Office 3,391,472
Patented July 9, 1968

3,391,472
APPARATUS FOR CONVEYING AND
DRYING PELLETS
Charles R. Landers, 5155 Winifred,
Fort Worth, Tex. 76133
Filed Oct. 1, 1965, Ser. No. 491,918
6 Claims. (Cl. 34—189)

My invention relates in general to apparatus for further processing feed which has been previously transformed into pellet form by a pellet mill. In particular, my invention relates to apparatus for cooling and drying freshly extruded and damp pellets and for conveying these pellets to highly elevated locations where they may be further processed and prepared for use.

A commonly used pellet handling system utilizes a pellet drying machine in which pellets are cooled and dried as they are moved by a horizontal conveyor. To load the pellets onto the horizontal conveyor, it is common to use a "hot leg" conveyor, which is a short vertical conveyor that lifts the damp and hot pellets from a boot or bin onto the horizontal conveyor. The buckets of "hot leg" conveyors scoop up the damp and soft pellets with an action that mashes or destroys many of them. This generates a large amount of small particles of feed called "fines" and is undesirable since the fines must be reprocessed to place then once again in pellet form.

After pellets have been dried on the horizontal conveyor of the above system, they are generally elevated to a high position in the plant so that gravity may be utilized to facilitate their further processing. Having separate machines for cooling and drying and for elevating feed pellets creates significant disadvantages. One disadvantage is that valuable floor space is frequently sacrificed to make room for two machines. Moreover, plant design is complicated by such prior art arrangements, since frequently it is necessary to place pellet mills in elevated positions (such as for example on the third floor of the plants) to enable convenient transfer of the pellets to the horizontal conveyors, to shakers (which separate fines from pellets), and so on.

Accordingly, it is a general object of my invention to provide improved apparatus for cooling, drying and for conveying pellets to highly elevated positions.

Another object of my invention is to provide a pellet cooling, drying and conveying apparatus in which the housing and conveyor means cooperate in a manner that tends to maximize the effectiveness of the air that is forced through the apparatus to dry the pellets.

Another object of my invention is to provide pellet cooling, drying and conveying apparatus in which the mounting of the pellet conveying trays to the conveyor means and the construction of the trays themselves cooperate with the housing and conveyor means of the apparatus to further maximize the effectiveness of the air flow for cooling and drying pellets.

Another object of my invention is to provide apparatus for simultaneously cooling, drying and elevating pellets in which a housing that surrounds the apparatus includes means that may be effectively utilized to direct the air flow within the housing to give greater control over the cooling and drying process of the pellets.

These and other objects are effected by my invention as will be apparent from the following description, taken in accordance with the accompanying drawing, in which.

Figure 1:
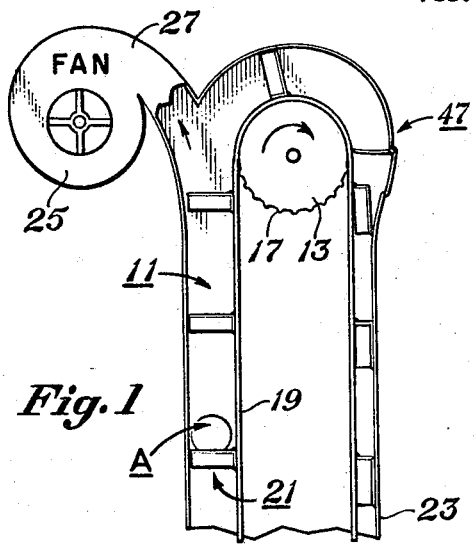
FIG. 1 is a side elevational view, partially in section, showing a pellet cooling, drying and conveying apparatus which is constructed in accordance with the principles of my invention.
Figure 2:
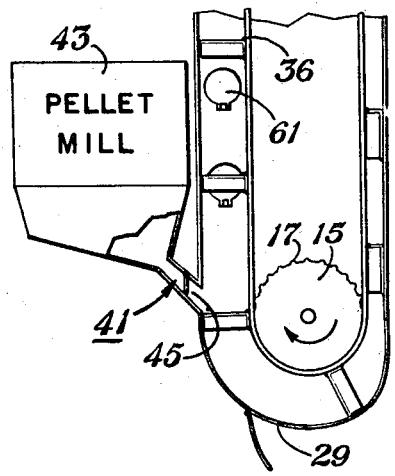
FIG. 2 is a front elevational view, partially in section, of the apparatus shown in FIG. 1.
Figure 2:
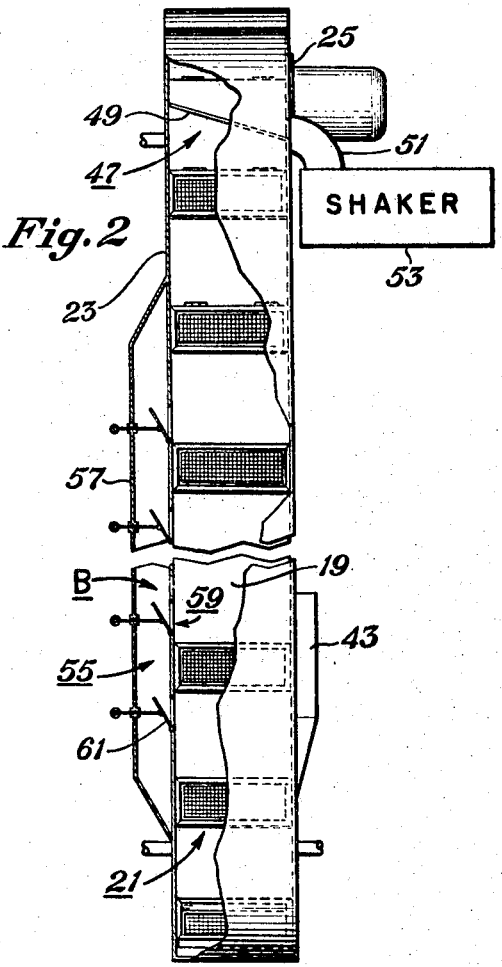

Referring initially to FIGS. 1 and 2 of the drawing, the numeral 11 represents vertical conveyor means in general having substantially vertically spaced apart and powered roller means 13, 15. At least one of the roller means 13, 15 is powered by conventional means (not shown) such as an electric motor and a suitable gear reduction unit. To eliminate slippage, the roller means preferably includes an outer periphery in the form of a sprocket 17 which engages mating detents in the inner surface of the associated conveyor belt 19. Thus, rotation of either of the roller means 13, 15 will produce positive movements of conveyor belt 19 and rotation of the other roller means.

Secured to the outer surface of conveyor belt 19 are a plurality of spaced apart pellet conveying trays 21. The purpose of these trays is to contain pellets during vertical elevation through the apparatus. A preferred form of these pellet conveying trays will be explained later in conjunction with FIG. 3.

Surrounding conveyor means 11 is a housing 23, the inner surface of which extends in close proximity with the outer edges of the pellet conveying trays 21 and with the outer edges of conveyor belt 19. The conveyor belt 19 is preferably constructed in an air impervious material, such as rubber covered fabric, and its edges are adapted to engage the inner surface of housing 23 to form an effective seal that prevents air flow around its edges. Hence, the housing 23 has a region A (see FIG. 1) through which air may flow. In one form of my invention there is a second air flow region B (see FIG. 2), the purpose of which will be subsequently explained.

Means are provided for generating air flow within housing 23 and through region A thereof, and in FIG. 1 this means is shown as being a conventional squirrel cage fan 25, which communicates with the housing 23 via a conduit 27 that intersects the housing at an upper region thereof. Air inlet means 29 is included at a lower region of housing 23 so that the air is forced to flow from the lower region to the upper region of the housing.

Figure 3:
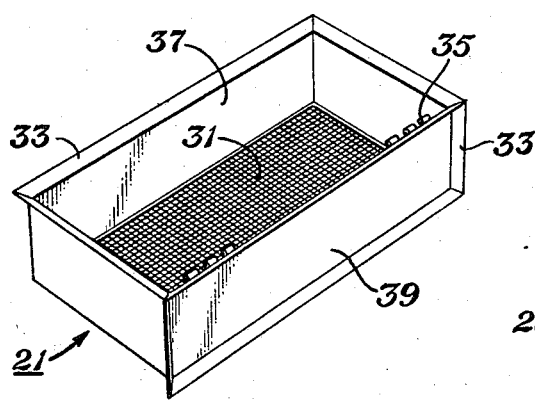
FIG. 3 is a perspective view which shows a pellet conveying tray which is constructed in accordance with the principles of my invention.

Referring now to FIG. 3, each pellet conveying tray 21 is preferably rectangular in form and has a bottom portion 31 which is formed at least partially of a foraminous material, such as metallic wire screen. Alternatively, bottom portion 31 may be of perforated sheet metal, which comes within the scope of the term "foraminous." Moreover, the upper and outer periphery of each of these trays preferably has a sealing material such as a rubber sealing lip 33 secured thereto. Thus, when the trays 21 are in the pellet elevating position (as shown on the left side of the FIG. 1 illustration), the sealing means of each tray engages the inner surfaces of the housing 23 so that air flows vertically through region A of housing 23 and through the bottom portion 31 of each tray.

Figure 4:
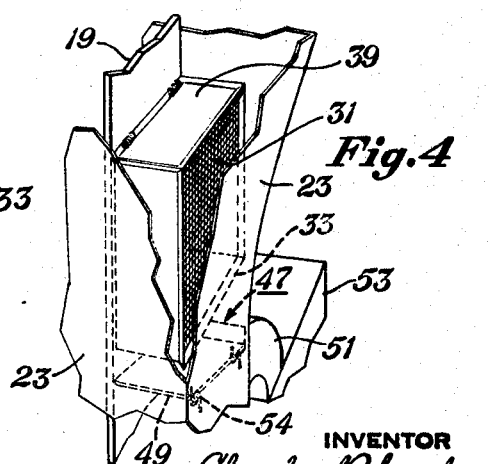
FIG. 4 is a fragmentary perspective view showing a tray similar to the one illustrated in FIG. 3 when descending on the conveyor.

The trays shown in FIG. 3 having hinges 35 to enable pivotal attachment to protrusions 36 on the outer surface of the conveyor belt 19. As shown, the hinges are located on the upper edge of each tray such that when positioned on the elevating side of the conveyor the trays assumed a horizontal position. As each tray is moved to the descending position (as illustrated on the right side of FIG. 1), it is urged by gravity to assume a vertical position. The walls 37 of the tray are preferably formed of an air impervious material, and the seal material 33 is formed around the edge of the upwardly facing (as seen in FIG. 4) wall 39 of each tray such that the flow of air is eliminated or significantly decreased on the right side of the conveyor due to the cooperative relationship between trays 21 and housing 23. An advantage of such an arrangement is that a greater amount of the air is channeled through region A of the apparatus and through the bottom portions 31 of the trays while they are in their horizontal or elevating positions.

The apparatus includes pellet receiving means 41 in a lower region thereof, the purpose of which is to transfer the soft and damp pellets from pellet mill 43 to the housing 23. The pellet receiving means preferably includes an inlet control valve 45, which may be manually or automatically opened or closed to control the flow of pellets into housing 23 and to help prevent excessive flow of air to the pellet mill.

The apparatus also includes pellet discharging means 47 in an upper region of housing 23 so that pellets may be withdrawn from the conveyor system. The pellet discharging means 47 illustrated in the drawing includes an elongated member 49 which is preferably fabricated of flexible and resilient material such as rubber (see especially FIG. 4) and which extends across the path of descending pellet conveying trays 21. Thus, dried pellets are deflected by member 49 to a conduit 51 that generally leads to a shaker 53, which separates fines from the pellets. Since member 49 is biased by spring hinges 54, it is pushed downward by descending trays and immediately springs back into a pellet deflecting position after each tray passes by. Two or more vertically separated members are preferably provided to insure the deflection of essentially all pellets.

It is advantageous to include in the apparatus means to control the flow of air through various regions or portions of the housing, and for this purpose air directing means 55 (see FIG. 2) are provided. Such means includes a conduit 57 that is secured to the housing 23 to form a second air flow region B. Port means 59 interconnect regions A and B of the apparatus and control valves 61 are included therein to enable variations in the size openings of the port means so that by selectively and individually adjusting the control valves, the air may be made to flow in a controlled manner throughout the various vertical portions of regions A and B.

In operation soft and damp pellets are received through pellet receiving means 41 at the lower region of the apparatus and are transferred to pellet conveying trays 21, which assume a horizontal position when being raised by conveyor belt 19.

The fan 25 is started to generate air flow which travels from the lower to the upper region of the housing 23 and through the pellets and the foraminous bottom portion 31 of pellet conveying trays 21. As the pellets are elevated through the housing they are dried and hardened. As the pellet conveying trays 21 pass over top roller means 13, the pellets are discharged from the trays and are engaged by member 49 of pellet discharge means 47. They are delivered to conduit 51 and to shaker 53 or to other selected machines or storage areas.

The control valves 61 of port means 59 which interconnect regions A and B of housing 23 are individually adjustable so that the flow of air through the various vertical regions or portions of the apparatus may be conveniently and effectively controlled. The driest and hence the most effective air for drying the pellets enters the housing 23 through inlet means 29 at the lower region thereof. As the air passes through the pellet conveying trays 21, moisture is transferred from the pellets to the air and hence the ability of the flowing air to absorb moisture from the pellets is continuously decreased. To compensate for the resulting varied moisture content of the air within the housing 23, control devices (here valves) 61 of the port means 59 may be used to control the volume of air passing through the various vertical portions of the housing. Thus, even though the moisture absorbing ability of the air flowing across trays 21 in the upper portions of the housing tends to become limited, by increasing the volume of air flow in such portions the pellets passing therethrough may be dried more effectively than is otherwise possible.

It should be apparent from the foregoing that I have provided an invention having significant advantages. The provision of apparatus as described above which is capable of simultaneously and effectively cooling, drying and conveying pellets to high elevations enables more effective utilization of plant space. The provision of a vertical conveyor which simultaneously cools and dries pellets enables arrangement with a pellet mill such that the pellets are transferred to the conveyor with little likelihood of damage, as contrasted with such prior art devices as horizontal conveyors that use a "hot leg" conveyor for loading. The combination into one machine of improved apparatus for performing two previously separated functions is economical as well as space saving. The vertical arrangement of the conveyor portions of the apparatus enables effective utilization of air flow, and the trays 21 which contain the pellets have a configuration such that the air flows effectively through them to dry the pellets. Moreover, the trays are constructed in a manner such that they cooperate with the housing of the apparatus to form seals that maximize the effectiveness of the air for drying pellets. In addition, by providing means in the apparatus by which the flow of air may be directed conveniently between the various vertical portions or regions of the apparatus, more effective drying of the pellets may be accomplished.

While I have shown my invention in only one form, it will be obvious to those skilled in the art that it is not so limited, but is susceptible of various changes and modifications without departing from the spirit thereof.

I claim:

1. Apparatus for simultaneously cooling, drying and elevating pellets, said apparatus comprising:
   (a) a substantially vertical conveyor means;
   (b) pellet conveying trays secured to said conveyor means and being constructed at least partially of foraminous material to permit air flow therethrough during elevation of said trays;
   (c) a housing surrounding said conveyor means and having a configuration for directing air into communication with said trays during elevation thereof;
   (d) means connected with said housing for creating air flow therein for drying the pellets;
   (e) an inlet conduit communicating with a lower region of said housing through an inlet valve located in the housing above each tray as it assumes a substantially horizontal upwardly traveling position for feeding damp pellets onto said trays;
   (f) pellet discharging means connected with said housing to discharge dried pellets therefrom; and
   (g) said pellet conveying trays having a length, width, and depth to receive essentially all pellets discharged from said valve to prevent accumulation of pellets in the lower region of the housing and to prevent the generation of "fines" through disintegration of the pellets with destructive shear and compressive forces otherwise exerted on the pellets between the pellet conveying trays and housing.

2. In an apparatus for simultaneously cooling, drying and elevating pellets, the combination of:
   (a) conveyor means having an air impervious conveyor belt spanning vertically separated and powered roller means;
   (b) pellet conveying trays that include a bottom constructed at least partially of a foraminous material and that are pivotally secured to said belt to assume a horizontal position during elevation and a vertical position during descent;
   (c) a housing that extends into close proximity with the edges of said belt and the periphery of said trays to direct air flow through the foraminous portions of said trays during elevation thereof;
(d) means for forcing air through said housing;
(e) pellet receiving means connected with a lower region of said housing by means of an inlet valve located in the housing above each tray as it assumes a horizontal, upwardly traveling position for receiving damp pellets;
(f) pellet discharging means connected with said housing to discharge dried pellets therefrom; and
(g) said pellet conveying trays having a length, width, and depth to receive essentially all pellets discharged from said valve to prevent accumulation of pellets in the lower region of the housing and to prevent the generation of "fines" through disintegration of the pellets with destructive shear and compressive forces otherwise exerted on the pellets between the pellet conveying trays and housing.

3. The invention as defined by claim 2 in which the pellet conveying trays have seal means along their periphery to direct greater volumes of air through said foraminous material.

4. In apparatus having conveyor means for elevating pellets and means for simultaneously cooling and drying said pellets, the combination of:
(a) pellet conveying trays having bottom portions constructed of foraminous material and walls constructed of substantially air impervious material;
(b) hinge means for pivotally connecting said trays to said conveyor means such that the trays assume a horizontal position during ascent but rotate substantially 270 degrees into a vertical position during descent; and
(c) a housing surrounding said apparatus and extending into close proximity with said tray and said conveyor means whereby air is directed against said trays and flows through the foraminous bottom portions of ascending trays but is blocked by the air impervious material of the descending tray walls.

5. The invention as defined by claim 4 in which the trays have seal means along their peripheries to engage said housing to direct greater volumes of air through the foraminous portions of the bottoms of said trays.

6. In apparatus for simultaneously cooling, drying and elevating pellets to a selected location, the combination of:
(a) powered and vertical extending conveyor means;
(b) trays secured to said conveyor means for receiving and elevating pellets;
(c) a housing surrounding said conveyor means and said trays and having a configuration for directing air into communication with said trays;
(d) means connected with said housing for generating air flow therein;
(e) an inlet conduit communicating with a lower region of said housing above each tray as it assumes a substantially horizontal and upward traveling position;
(f) pellet discharging means connected with said housing to discharge dried pellets from the trays at a selected elevation;
(g) said pellet conveying trays having a configuration to receive essentially all pellets discharged onto the trays from the inlet conduit to prevent accumulation of pellets in the lower region of the housing and to prevent the generation of "fines" through disintegration of pellets with destructive shear and compressive forces otherwise developed on the pellets between the pellet conveying trays and the lower region of the housing.

References Cited
UNITED STATES PATENTS

| Re. 4,792 | 3/1872 | Smith | 34—189 |
| 152,859 | 7/1874 | Nordyke et al. | 198—152 |
| 339,874 | 4/1886 | Gathmann | 34—189 |
| 983,198 | 1/1911 | Applegate | 34—64 |
| 2,122,036 | 6/1938 | Lindburg | 198—152 |
| 2,280,941 | 4/1942 | Adams | 198—145 |
| 2,295,732 | 9/1942 | Hess | 34—242 XR |
| 2,747,723 | 5/1956 | Hapman | 198—148 |

FREDERICK L. MATTESON, JR., *Primary Examiner.*

C. R. REMKE, H. B. RAMEY, *Assistant Examiners.*